(12) United States Patent
Barrau et al.

(10) Patent No.: US 10,859,380 B2
(45) Date of Patent: Dec. 8, 2020

(54) ALIGNMENT METHOD FOR AN INERTIAL UNIT

(71) Applicants: SAGEM DEFENSE SECURITE, Boulogne-Billancourt (FR); ASSOCIATION POUR LA RECHERCHE DEVELOPPMENT DES METHODES ET PROCESSUS INDUSTRIELS—A.R.M.I.N.E.S., Paris (FR)

(72) Inventors: Axel Barrau, Boulogne-Billancourt (FR); Silvere Bonnabel, Boulogne-Billancourt (FR)

(73) Assignees: SAFRAN ELECTRONICS & DEFENSE, Boulogne-Billancourt (FR); ASSOCIATION POUR LA RECHERCHE DEVELOPPEMENT DES METHODES ET PROCESSUS INDUSTRIELS—A.R.M.I.N.E.S., Paris (FR)

( * ) Notice: Subject to any disclaimer, the term of this patent is extended or adjusted under 35 U.S.C. 154(b) by 246 days.

(21) Appl. No.: 15/037,653

(22) PCT Filed: Nov. 24, 2014

(86) PCT No.: PCT/EP2014/075439
§ 371 (c)(1),
(2) Date: May 18, 2016

(87) PCT Pub. No.: WO2015/075248
PCT Pub. Date: May 28, 2015

(65) Prior Publication Data
US 2016/0290808 A1    Oct. 6, 2016

(30) Foreign Application Priority Data

Nov. 22, 2013 (FR) .................................. 13 02705
Jul. 4, 2014 (FR) .................................. 14 01512

(51) Int. Cl.
*G01C 21/16* (2006.01)
*G01C 25/00* (2006.01)

(52) U.S. Cl.
CPC ......... *G01C 21/165* (2013.01); *G01C 25/005* (2013.01)

(58) Field of Classification Search
CPC combination set(s) only.
See application file for complete search history.

(56) References Cited

U.S. PATENT DOCUMENTS 5,375,059 A * 12/1994 Kyrtsos .............. B60K 31/0008
                                                    342/357.24
5,610,815 A *  3/1997 Gudat .................... G01S 19/11
                                                    318/587

(Continued)

OTHER PUBLICATIONS

French Search Report and Written Opinion, dated Feb. 16, 2015, French Application No. 1401512.

(Continued)

*Primary Examiner* — Mohamed Charioui
(74) *Attorney, Agent, or Firm* — Womble Bond Dickinson (US) LLP (57) ABSTRACT

The invention relates to an alignment method based on a simplified mode allowing processing using an invariant Kalman filter, in which each speed involved in the navigation equations is expressed in a work reference frame (Rt) translated with respect to an inertial reference frame (Ri) and for which the origin moves along a reference inertial trajectory, the carrier of which is assumed to be close (geographic origin for alignment with the sun at known position, GPS trajectory for alignment in-motion, etc.). This simplified mode comprises the repetition of the following steps to estimate a mobile carrier state (P): —propagation (PROP) determining an estimated current state from a preceding estimated state, inertial sensor measurements and theoretical (Continued)

information on the carrier trajectory (P) —updating (MAJ) the estimated state using theoretical information on the carrier trajectory (P). The deterministic uncertainties of the sensors (bias/drift/scale factors, etc.) are only estimated during the propagation and update steps. A perturbation step (PERT) then allows inclusion of the values ignored in the simplified mode and estimation of these values by an optimisation method.

12 Claims, 5 Drawing Sheets

(56) References Cited

U.S. PATENT DOCUMENTS

| | | | | |
|---|---|---|---|---|
| 7,957,899 | B2* | 6/2011 | Changey | G01C 21/165 701/510 |
| 8,682,581 | B2* | 3/2014 | Psiaki | G01S 19/31 701/469 |
| 9,784,582 | B2* | 10/2017 | Georgy | G01S 19/47 |
| 2003/0149528 | A1* | 8/2003 | Lin | G01C 21/165 701/472 |
| 2004/0150557 | A1 | 8/2004 | Ford et al. | |
| 2005/0065726 | A1* | 3/2005 | Meyer | B61L 25/023 701/470 |

OTHER PUBLICATIONS

French Search Report and Written Opinion, dated Sep. 11, 2014, French Application No. 1302705.
Bonnabel, Silvere, et al., "Invariant Extended Kalman Filter: theory and application to a velocity-aided attitude estimation problem", *Joint 48th IEEE Conference on Decision and Control and 28th Chinese Control Conference*, (Dec. 19, 2009), 1297-1304.
Bonnabel, Silvere, et al., "Symmetry-Preserving Observers", *IEEE Transactions on Automatic Control*, vol. 53, No. 11, (Dec. 1, 2008), 2514-2526.

* cited by examiner

ALIGNMENT METHOD FOR AN INERTIAL UNIT

GENERAL FIELD

The invention relates to the field of inertial navigation units, and carrier device alignment methods comprising such units.

PRIOR ART

Many solutions for aligning an carrier device comprising an inertial unit are known from the prior art.

To execute an alignment, this starts out a priori from the approximate followed trajectory. For example, the trajectory followed by a stopped carrier device at a known point of the surface of the earth is a zero movement if this is in the geographic reference frame and a rotation movement about the axis of the poles if this is in an inertial reference attached to the centre of the earth. This trajectory is never exact (a vehicle undergoes vibrations of its motor, vertical movements when passengers enter and leave, etc.) but always close to reality. A known alignment solution (also used by the new process) consists in considering this trajectory a priori as a measurement originating from a virtual sensor. For example, for a stopped vehicle fitted with an inertial measurement unit (IMU), it will be considered that there is a speed sensor always giving the response "zero" in the geographical reference frame, and giving the speed of the trajectory a priori if this is in another reference frame. It can also be considered that there is a position sensor always giving the response "zero" if this is in the geographical reference frame, and giving the position of the trajectory a priori in another reference frame. The two sensors can also be used at the same time (since they do not exist). A measuring noise which corresponds in reality to our own uncertainty on the trajectory is attributed to this virtual sensor. For example, always in the case of an immobile carrier device, if the choice was made to align by using zero displacement information, a noise will be added whereof the standard deviation is a few centimeters (the apparatus which is being aligned can in fact move a few centimeters away from the trajectory a priori, for example if the trunk of a car is being loaded and unloaded). A filter of Kalman type is usually used to integrate this (virtual) measurement.

Such a Kalman filter typically carries out a propagation step and an updating step repeated over time: the propagation step calculates an estimated state of the carrier device and an uncertainty relative to this estimated state; the updating step integrates information a priori on the trajectory.

However, these propagation and updating steps produce non-linear equations which prevent the use of a known Kalman filter.

To circumvent such a limitation, it has been proposed to use a Kalman filter known as "Extended Kalman Filter" (EKF), in which the matrices used in the non-linear equations corresponding to the propagation and updating steps form the object of linearization, by a development at the order 1 at a given point of the vector space associated with the selected state vector.

Document EP 1 862 764 has proposed an alignment method using extended Kalman filters based on integration of displacement or low-speed information. Throughout this method, the trajectory of the carrier device is calculated from inertial data and estimation of its orientation, then (virtual) observation of a speed or zero displacement (near a noise) is integrated by means of an extended Kalman filter.

Such an alignment method works only if the point at which the development at the order 1 made to linearize the equations of the extended Kalman filter is sufficiently precise; the estimation error caused by this development must in fact be low (a few degrees at most). If the linearization point is not precise enough, calculations made by the extended Kalman filter during the propagation and updating steps can in time result in false estimations.

Two preliminary steps have been proposed to determine a precise point of linearization during the use of an extended Kalman filter applied to alignment of an carrier device:
- research into vertical, during which the vertical is estimated considering that the accelerometer observes gravity (around 2 seconds),
- research into a rough direction, during which the direction is estimated by a filtering process based on a simplified model (around 1 minute).

These preliminary steps are not only long and complex to execute, but also fail to protect the inertial measurement unit from future divergences (estimation of the filter moves away from the real state).

PRESENTATION OF THE INVENTION

The invention therefore aims to enable alignment of an carrier device more precisely and faster than with the cited techniques of the prior art.

An alignment method is proposed for a movable carrier device in an inertial reference frame and comprising an inertial measurement unit, the inertial measurement unit comprising a plurality of inertial sensors and at least one invariant Kalman filter, the method comprising repetition of the following steps for estimating a state of the carrier device representative of its speed and its orientation:
  an propagation step determining an estimated current state from a preceding estimated state and measurements of the inertial sensors,
  An update step updating the estimated state by means of the information a priori on the trajectory of the carrier device,
Wherein the inertial sensors (accelerometer and gyroscope or gyrometer for example) measure acceleration and angular speed, both expressed in the reference frame of the unit. These data occur in the propagation step: the estimated current state (orientation, speed and optionally position) is obtained by integrating the angular speeds measured by the gyroscopes or gyrometers (updated from the orientation) and accelerations measured by the accelerometers (updated of the speed).

These accelerations are first projected into the work reference frame by using the estimated orientation, then gravity is subtracted from them as the accelerometer is not capable of differentiating this force from acceleration. If the aim is to estimate a position, the resulting speeds can be integrated, this operation also forming part of the propagation.

The updating step is the integration of the speed or position information given by the virtual sensor. This information (originating from the a priori on the trajectory) is called "zero speed information" or "zero displacement information". This step updates all the data (orientation/speed/position) from the speed or position information. In fact, the zero speed/displacement information contains implicit information on orientation.

If it is supposed initially that the orientation is well estimated, the accelerometer measures in its reference frame a physical quantity equal to the sum of the real acceleration and of gravity. The unit being stopped, the real acceleration will be very low and the measurement will contain almost gravity only. During the propagation step, the acceleration measured is projected in the inertial reference frame (or the work reference frame) by means of the estimated orientation matrix. The obtained quantity is gravity, expressed this time in the inertial reference frame (or the work reference frame). Gravity (known) is subtracted and this gives acceleration very close to zero. This quantity is integrated over time and results in a speed which also is very low.

If however it is supposed that the estimated orientation is inclined by a few degrees to the east relative to reality, when the acceleration information is projected in the inertial reference frame using this false orientation estimation, the vector obtained does not coincide with the gravity. Once gravity (known) is subtracted, this gives a non-zero vector, pointing to the west. After integration over time, this results therefore in a non-zero speed directed to the west. Poor orientation therefore influences the speed estimation. Reciprocally, a non-zero speed at the time of the update is interpreted as an orientation error. This is what a Kalman filter does (extended, invariant or other). So the update requires only acquisition of the "zero speed" or "zero displacement" (virtual) information but not real speed measurement nor orientation information. This (virtual) measurement is sufficient to find the orientation of the unit.

According to an aspect of the proposed method, to allow processing by an invariant Kalman filter, a simplified mode is used in which each speed occurring in the updating equations is expressed in a work reference frame translated relative to the inertial reference frame and whereof the origin moves along an inertial reference trajectory whereof the carrier device is deemed close, the bias of the sensors not being estimated during propagation and updating steps.

The origin can be that of the geographical reference frame (for alignment on the ground at a known position, for example); it can correspond to the GPS trajectory (for in-flight alignment, for example).

Advantageously also, processing is carried out in parallel in which additional quantities influencing the estimation are estimated in the following way:

at each instant the differential relative to the additional quantities of the estimation provided by the simplified mode is calculated recursively.

the additional quantities are calculated by optimization of a quality criterion of the estimation.

The calculation differential employed expresses the estimated state of the carrier device as a refined function of additional quantities.

According to another aspect, an inertial measurement unit movable in an inertial reference frame is also proposed, comprising:

a plurality of inertial sensors,
an invariant Kalman filter, said unit comprising an embedded computer executing the proposed alignment method.

DESCRIPTION OF FIGURES

Other characteristics, aims and advantages of the invention will emerge from the following description which is purely illustrative and non-limiting and which must be considered in relation to the appended drawings, in which.

Similar elements have identical reference numerals in all figures.

DETAILED DESCRIPTION OF THE INVENTION

Figure 1:
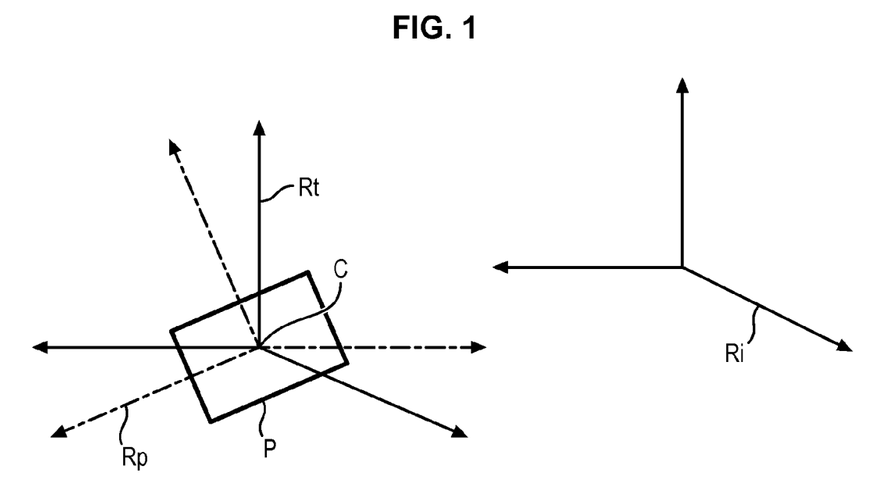
FIG. 1 illustrates an inertial measurement unit according to an embodiment of the invention.

In reference to FIG. 1, a carrier device P is movable in a predetermined inertial reference defined by an inertial reference frame Ri.

An example of inertial reference frame is the reference frame centered on the center of the earth, whereof the axis z points towards the north pole, whereof the axis x points towards the intersection of the Greenwich meridian and the equator at time t=0 (the point defined will then move in our reference frame due to rotation of the earth) and whereof the axis y points in the direction of the vector z×x, × designating the cross product).

A reference frame of the carrier device Rp is fixed relative to the unit. For example, the most frequently used axes are directed towards the front, the right and the base of the unit. Its origin is a fixed point of the unit. The origin of a geographical reference frame Rg is the position of the unit and is composed of three axes directed towards the north, the west and upwards.

A reference frame Rt called "work reference frame" is also shown, which is the reference frame in translation relative to the inertial reference frame Ri (that is, axes aligned with the axes of the inertial reference frame Ri) whereof the origin C is that of the geographical reference frame Rg.

Figure 2:
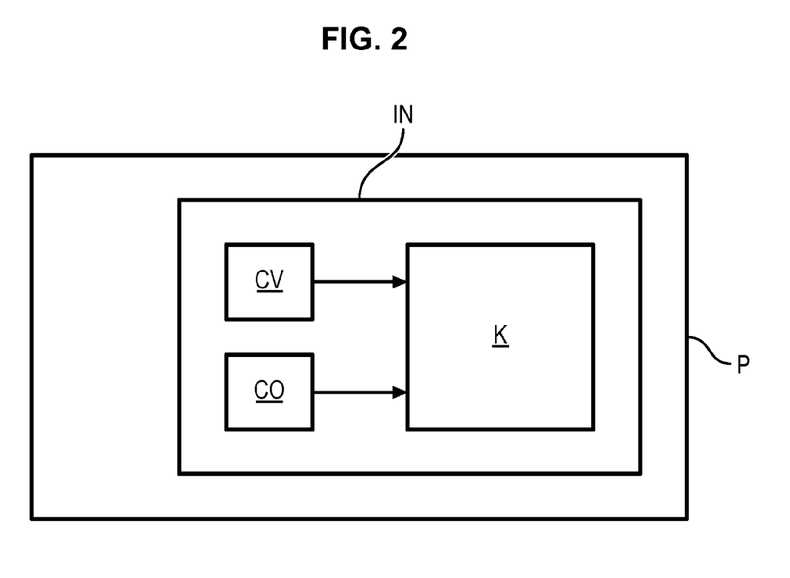
FIG. 2 illustrates an inertial measurement unit according to an embodiment of the invention.

In reference to FIG. 2, the carrier device P comprises an inertial measurement unit IN.

The inertial measurement unit IN comprises a plurality of inertial sensors CV, CO and a computer configured to operate an invariant Kalman filter K.

The inertial measurement unit IN is supposed to be fixed relative to the work reference frame Rt.

The plurality of sensors comprises at least one acceleration sensor CV (for example, an accelerometer) and at least one angular speed sensor CO (for example, a gyroscope or a gyrometer).

The invariant Kalman filter K is a recursive estimator of a state of the carrier device, this state being representative of the speed of this carrier device and its orientation.

The invariant Kalman filter K is more particularly configured to determine an estimated current state of the carrier device from a preceding estimated state of the carrier device by means of predefined propagation equations: this refers to propagation.

The propagation equations are predetermined from the measurements of the inertial sensors.

The invariant Kalman filter K is also configured to update the estimated current state by means of predefined updating equations, in which the information a priori on the trajectory occurs (for example information on low speed).

The invariant Kalman filter K is also configured so that each speed occurring in the updating equation is expressed in the work reference frame.

The inertial measurement unit IN can for example construct its work reference frame by means of GNSS/GPS receivers.

The step which will now be described is repeated from the first instant of the alignment procedure.

The first estimation $\hat{x}_0$ is any one. It is supposed that a preceding estimation of the state x, noted $\hat{x}_{t-1}$, has already been determined, as well as a matrix P representing the uncertainty of the estimation.

Figure 3A:
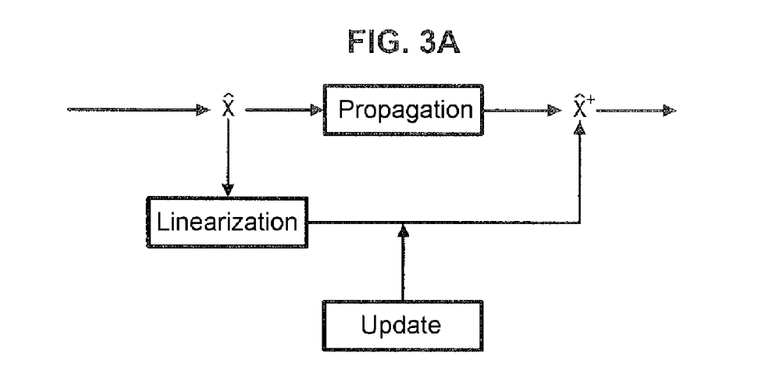
FIGS. 3A and 3B are schematic diagrams of an extended Kalman filter and an invariant Kalman filter, respectively.

In reference to FIG. 3A, determination of a current estimation $\hat{x}^+$ by a known extended Kalman filter depends on the preceding estimation $\hat{x}$ (by means of a propagation step) and measurements acquired during the current iteration (by means of linearization and updating steps)

The calculation of $\hat{x}^+$ involves a gain matrix L in turn dependent on the value of $\hat{x}$.

The introduction of the work reference frame Rt and a simplified model ignoring the bias of sensors here allows the use of an invariant filter.

Figure 3B:
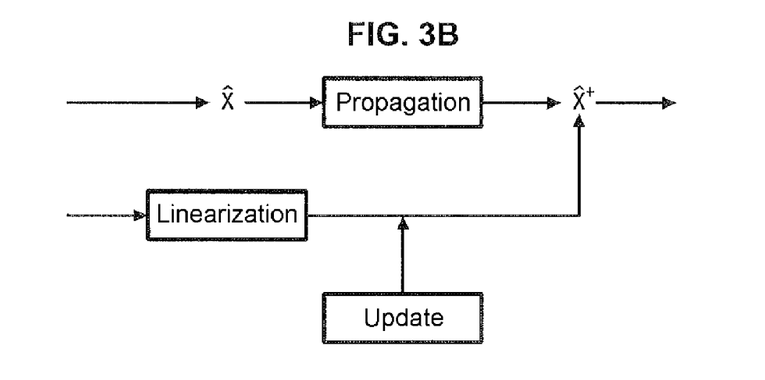

In reference to FIG. 3B, an invariant Kalman filter calculates the current estimation $\hat{x}^+$ of the state differently to an ordinary extended Kalman filter, by means of equations selected particularly (these equations will be detailed hereinbelow).

The state of the carrier device can be represented either conventionally by a speed v and orientation T (T is a rotation matrix or a quaternion), or by a displacement matrix χ of the form:

$$\chi = \begin{pmatrix} T & v \\ 0 & 1 \end{pmatrix}$$

Other representations are possible, of course.

It is clear here that the name "displacement matrix" does not necessarily illustrate displacement. It comes from usage done when they were introduced for robotic problems (they contained orientation and position and clearly represented displacement).

P is called the estimation uncertainty of the state x. An interesting property of the invariant filter K is that the gain matrix L occurring in the updating step does not depend on the preceding estimation $\hat{x}$.

This builds a simplified system enabling usage of an invariant Kalman filter (and therefore a convergence without research steps into vertical and coarse alignment), having the following characteristics: 1) an unusual reference frame is used to work in. 2) The determinist part of the errors of the inertial sensors (bias/drift/scale factor errors) are unknown.

In an embodiment, the gravity used in the propagation equations is considered as dependent only on time and not position, which simplifies the resolution calculations of these equations.

The known fine alignment process does not involve a simplified model. It directly integrates all the variables in the model, disallowing usage of an IEKF.

The updating step of an IEKF for alignment is expressed either with displacement matrices or with the initial variables v and T of the work reference (by subtracting them from the displacement matrices):

$$\hat{v}^+ = K_v(\hat{v}) + K_\xi(\hat{v})\hat{v}$$

$$\hat{T}^+ = K_\xi(\hat{v})\hat{T}$$

$K_\xi$ and $K_v$ are functions originating from the exponential map defined later, such as $$\exp(L_t x) = \begin{pmatrix} K_\xi(x) & K_v(x) \\ 0_{1 \times 3} & 1 \end{pmatrix}$$

where $L_t$ is a matrix dependent on P.

P follows an equation dependent only on time. The latter is obtained by linearizing the equations verified by $\delta v = \hat{v} - \hat{T}T^{-1}v$ and $\delta T = \hat{T}T^{-1}$ around 0 and $I_3$ (the matrix identity of size 3×3).

The exponential map exp is defined for $u \in \mathbb{R}^6$ by $\exp(u) = \text{expm}(D(u))$ where expm designates the known matricial exponential and where D( ) is the linear application arguing for a vector $$x = \begin{pmatrix} x_1 \\ x_2 \end{pmatrix}$$

of size 6×1 and rendering the elementary displacement matrix $$\begin{pmatrix} A(x_1) & x_2 \\ 0 & 1 \end{pmatrix}$$

of size 4×4, $A(x_1)$ designating the antisymmetric matrix such as for any vector $u \in \mathbb{R}^3$, $A(x_1)u = x_1 \times u$, × being the cross product.

Since the matrices of type D(u) have a particular form, the following closed formula can be used:

$$\exp\begin{pmatrix} u_1 \\ u_2 \end{pmatrix} = I_4 + D\begin{pmatrix} u_1 \\ u_2 \end{pmatrix} + \frac{[1 - \cos|u_2|]}{|u_2|^2} D\begin{pmatrix} u_1 \\ u_2 \end{pmatrix}^2 + \frac{[|u_2| - \sin|u_2|]}{|u_2|^3} D\begin{pmatrix} u_1 \\ u_2 \end{pmatrix}^3.$$

In an embodiment, the calculation which has just been described is iterated to convergence (simplified mode).

By way of variant (complete mode), it is also possible to estimate additional quantities (bias, drift, scale factor errors, etc.) by the method described hereinbelow.

Once this reduced filter is built, the differential of the estimated trajectory relative to the remaining parameters (bias/drift/scale factor errors) is calculated from the first instant of the alignment procedure about the zero value of these parameters. The estimated trajectory is expressed as a refined function of the parameters. A quadratic quality criterion of the estimated trajectory (for example the sum of the squares of the standards of the speeds estimated over time) is chosen. This criterion is a quadratic function of the parameters (bias/drift/scale factor errors) easily optimized to obtain their value. This process preserves the convergence properties of the filter constructed for the simplified system even if the number of estimated parameters is increased. This optimization can be done recursively over time, a single time on completion of alignment, or even at any instant during alignment. This choice has no influence on estimation. In all cases, the filtering of the simplified system and of the complete system are simultaneous.

In the processes employing coarse alignment, the latter is also carried out on a simplified system (different to that presented here) but the cut-out is temporary: 1 min of coarse alignment then fine alignment. Here, the two models function simultaneously from start to finish: at each instant the simplified filter gives its estimation, then the quadratic optimization calculates the complete state (without Kalman filtering) as a perturbation of the simplified state. The calculation of the differential of the trajectory is realizable in a reasonable time because the matrix P follows an equation dependent only on time (IEKF). If the simplified system were not by an IEKF, the latter estimation step of the ignored parameters in a first time would not be possible.

Alignment Method of Inertial Measurement Unit

Figure 4:
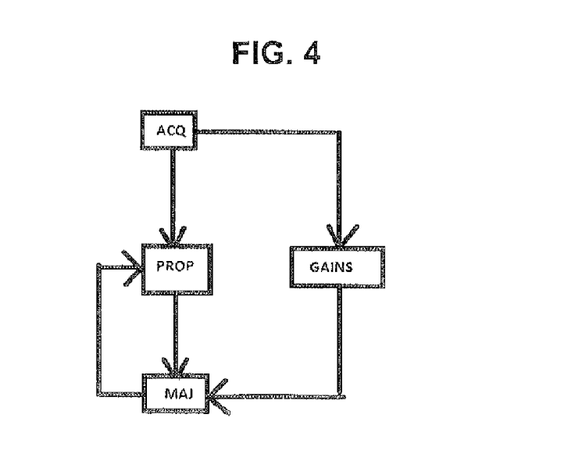
FIG. 4 illustrates the steps of an alignment method for an inertial measurement unit, according to an embodiment of the invention.

An alignment method of the inertial measurement unit IN (and therefore of the carrier device P) implementing the invariant Kalman filter K will now be described in reference to FIG. 4.

In an acquisition step ACQ, the trajectory of the work reference frame $R_t$ is updated by means of the information a priori concerning the trajectory.

In propagation step PROP, the Kalman filter K determines an estimated current state from a preceding estimated state, by means of the measurements of its inertial sensors CO, CV.

In an updating step MAJ, the Kalman filter K updates the estimated state of the carrier device by means of the virtual observation of zero speed (or zero displacement).

The acquisition ACQU, propagation PROP, and updating MAJ steps are repeated over time.

The alignment method therefore comprises several successive iterations, each new iteration inputting the updated estimated state obtained during a preceding iteration, and new observations (acquired during the acquisition step of this new iteration).

A computer program product comprising program code instructions for execution of the steps of the method described, when this program executed by a computer embedded in an inertial measurement unit, can also be implemented.

General Formalization of the Alignment Problem

First, the following notations will be used.

| | |
|---|---|
| $T_{[\frac{i}{m}]}$ | Passage matrix of the measurement reference frame towards the inertial reference frame |
| $v_i$ | Speed of the carrier device in the inertial reference frame |
| $x_i$ | Position of the carrier device in the inertial reference frame |
| $\omega$ | Measurements of the gyroscope or of the gyrometer |
| f | Measurements of the accelerometer |
| G | Earth attraction undergone by the carrier device |
| $w_\omega$ | Noise of the gyroscope or of the gyrometer (Random walk) |
| $w_f$ | Difference between the measured speed increment and the real speed increment |

A known formulation of the alignment by zero speed observation in an inertial reference is the following.

It is assumed that the position of the carrier device is known approximately. The consequence of this hypothesis, which the method capitalises on, is that local gravity is known and will be only a function of time.

The movement equations are expressed:

$$\dot{T}_{[\frac{i}{m}]} = T_{[\frac{i}{m}]} A(\omega + w_\omega)$$

$$\dot{v}_i = T_{[\frac{i}{m}]}(f + w_f) + G$$

$$\dot{x}_i = v_i$$

Where A(.) designates the antisymmetric matrix associated with a rotation vector (defined by the relation $\forall\ u_1, u_2 \in \mathbb{R}^3$, $A(u_1)u_2 = u_1 \times u_2$ where x is the cross product), A virtual measurement of speed ($w_h$ is a noise) is:

$$h\left(T_{[\frac{i}{m}]}, v_i\right) = v_i + w_h$$

Information will be introduced at regular intervals $$h\left(T_{[\frac{i}{m}]}, v_i\right) + w_h = V_i,$$

where $V_i$ is the expected speed of the carrier device P linked to the trajectory a priori, for example to that due to earth rotation (the zero speed observation usually done in the geographic reference frame is simply expressed in the inertial reference).

Reformulation of Movement Equations in the Work Reference Frame

This part details the propagation and update equations performed in an embodiment of the invention.

The work reference frame Rt (also referenced C hereinbelow) is as defined previously in translation relative to the inertial reference frame Ri (that is, its axes are aligned with the axes of the inertial reference frame Ri), and its origin C is that of the geographical reference frame g.

The following notations are introduced:

| | |
|---|---|
| $T_{[\frac{c}{m}]}$ | Passage matrix of the measurement reference frame towards the reference frame C |
| $x_c = x_i - C$ | Position of the carrier device in the reference frame C |
| $v_c = \dot{x}_c = v_i - \dot{C} = v_i - V_i$ | Speed of the carrier device in the reference frame C |
| $a = \ddot{C}$ | Acceleration in the inertial reference of the origin c of the reference frame C |

The movement equations of the carrier device P are expressed in the work reference frame Rt as follows:

$$\dot{T}_{[\frac{c}{m}]} = T_{[\frac{c}{m}]} A(\omega + w_\omega)$$

$$\dot{v}_C = T_{[\frac{c}{m}]}(f + w_f) + G - a$$

$$\dot{x}_c = v_c$$

As the position $x_c$, of the carrier device has no influence on the other parameters, it can therefore be deleted:

$$\dot{T}_{[\frac{C}{m}]} = T_{[\frac{C}{m}]}\omega$$

$$\dot{v}_C = T_{[\frac{C}{m}]}f + G - a$$

The zero speed information is also modified as follows:

$$h\left(T_{[\frac{C}{m}]}, v_C\right) = T_{[\frac{C}{m}]}^T v_C = 0 + \text{noise}$$

The state of the carrier device P estimated by the invariant Kalman filter K can be represented by a displacement matrix constituted from a passage matrix of the geographical reference frame towards the work reference frame, and the speed of the measured carrier device expressed in the work reference frame, the displacement matrix being constructed as follows:

$$X = \begin{pmatrix} T_{[\frac{C}{m}]} & v_C \\ 0 & 1 \end{pmatrix}$$

Of course, as a variant, the state of the carrier device could also be represented knownally, for example a matrix T and a vector v.

The inertial measurements and the information on gravity are written in elementary displacement matrices:

$$i = \begin{pmatrix} A(\omega) & f \\ 0 & 0 \end{pmatrix}$$

$$w = \begin{pmatrix} A(w_\omega) & w_f \\ 0 & 0 \end{pmatrix}$$

$$g = \begin{pmatrix} 0 & G-a \\ 0 & 0 \end{pmatrix}$$

The equations are rewritten more simply:

$$\dot{\chi} = \chi \cdot i + g \cdot \chi + \chi \cdot w$$

The observation function is also written simply:

$$h(\chi) = \chi^{-1} \begin{pmatrix} w_h \\ 1 \end{pmatrix}$$

A property of $h$ called "left-right equivariance", on which the invariant filtering is based is the following. Let Ø be an any displacement matrix (i.e, of the form $$\begin{pmatrix} R & u \\ 0 & 1 \end{pmatrix}$$

where R is an orthogonal matrix (3×3) and u any vector of $\mathbb{R}^3$). This gives:

$$h(\chi \varnothing) = (\chi \varnothing)^{-1} \begin{pmatrix} w_h \\ 1 \end{pmatrix} = \varnothing^{-1}\chi^{-1}\begin{pmatrix} w_h \\ 1 \end{pmatrix} = \varnothing^{-1}h(\chi)$$

The above can be interpreted as a change in variable on the space of states ($\chi$ is replaced by $\chi\varnothing$) associated with a change in variable on the space of observations. The term "invariant" comes from the fact that the filter is designed to be insensitive to this type of reparametrising.

An observer adapted to the preceding dynamic is the following:

$$\dot{\hat{\chi}} = \hat{\chi} \cdot i + g \cdot \hat{\chi}$$

The updating step MAJ is typically of the following form:

$$\hat{\chi}^+ K_t(\hat{\chi}, Y)\hat{\chi}$$

where $\hat{\chi}$ is the current estimated displacement matrix, $K_t$, a gain function (also called gain), Y a vector representing the virtual observation of zero speed, and $\hat{\chi}^+$ is a resulting estimated displacement matrix from the update.

The function $K_t$ corresponds to the t-th zero observation speed (and therefore the t-th iteration of the Kalman filter) and is of the form $K_t(u) = \exp(L_t u)$, where $\exp()$ designates the function called exponential map. $K_t$ is a function but $L_t$ is a matrix, called "gain matrix" or more simply "gain". The calculation process of the gains is detailed hereinbelow. The matrices $L_t$ are calculated by linearizing the equation verified by the error variable $\eta = \hat{\chi}\chi^{-1}$. Calculation of the equation verified by $\eta$ is the following:

During the propagation step the evolution equations of $\chi$ and $\hat{\chi}$ are known and the evolution equation of $\eta$ can therefore be calculated:

$$\dot{\eta} = \left(\frac{d}{dt}\hat{\chi}\right)\chi^{-1} + \hat{\chi}\left(\frac{d}{dt}\chi^{-1}\right) = \left(\frac{d}{dt}\hat{\chi}\right)\chi^{-1} - \hat{\chi}\chi^{-1}\left(\frac{d}{dt}\chi\right)\chi^{-1}$$

Introducing the equations verified by $\chi$ and $\hat{\chi}$ and using the fact that $v_c$ is small gives:

$$\dot{\eta} = g\eta - \eta g - \eta w$$

This is the continuous part of the evolution of the error variable. When the estimation $\hat{\chi}$ is updated, the error variable evolves discontinuously. The evolution of the error variable during the update of the estimation is particularly simple:

$$\eta^+ = \hat{\chi}^+\chi^{-1} = K_t(\hat{\chi},Y)\hat{\chi}\chi^{-1} = K_t(h(\hat{\chi}\chi^{-1},w_h))\hat{\chi}\chi^{-1} = K_t(h(\eta,w_h))\eta$$

The linearization of this equation is done in the following way: The exponential map argues for a vector of $\mathbb{R}^6$ and makes a displacement matrix. In particular, the image of the zero vector is the matrix identity $I_4$.

Vectors of $\mathbb{R}^6$ $\xi$ and $\xi^+$ ($\eta = \exp(\xi^+)$) can therefore be made to correspond to the error variables and the equation verified by $\xi$ and $\xi^+$ can be written and linearized around 0. The resulting equation involves the gains matrices $L_t$:

$$\dot{\xi} = ad_{g_t}\xi + \begin{pmatrix} w_\omega \\ w_f \end{pmatrix}$$

$$\xi^+ = \xi - L_t(H\xi + w)$$

with $$ad_{g_t} = \begin{pmatrix} 0_3 & 0_3 \\ A(g_t) & 0_3 \end{pmatrix},$$

$0_3$ being the matrix 3×3 containing only zeros, and $$H = \begin{pmatrix} 0_3 \\ I_3 \end{pmatrix}.$$

This equation is linear and the covariance $P_t$ of $\xi$ and the gains $L_t$ for minimising $P_t$ can be calculated simultaneously by means of the Riccati equation:

$$\dot{P}_t = ad_{g_t} P_t + P_t ad_{g_t}^T + Q$$

$$S_t = HP_t H^T + R$$

$$L_t = P_t H^T S_t^{-1}$$

$$P_{t_t}^+ = (I_6 - L_t H) P_{t_t}$$

where Q is the covariance matrix of the noise $$\begin{pmatrix} w_\omega \\ w_f \end{pmatrix}$$

and R the covariance matrix of the noise $w_h$.

Comparative Alignment Results

Results obtained with the alignment method which has just been described are compared hereinbelow (based on an invariant Kalman filter) and results obtained with a known alignment method (based on a known extended Kalman filter and used in a known unit).

The variables processed by the Kalman filters are orientation (attitude) of the carrier device and its speed. The position of the carrier device is considered known close to a hundred meters. The sensors used are supposedly without bias, and the observations used are zero speeds. The vertical of the carrier device is known close to 30 degrees, and its direction totally unknown.

Figure 5A:
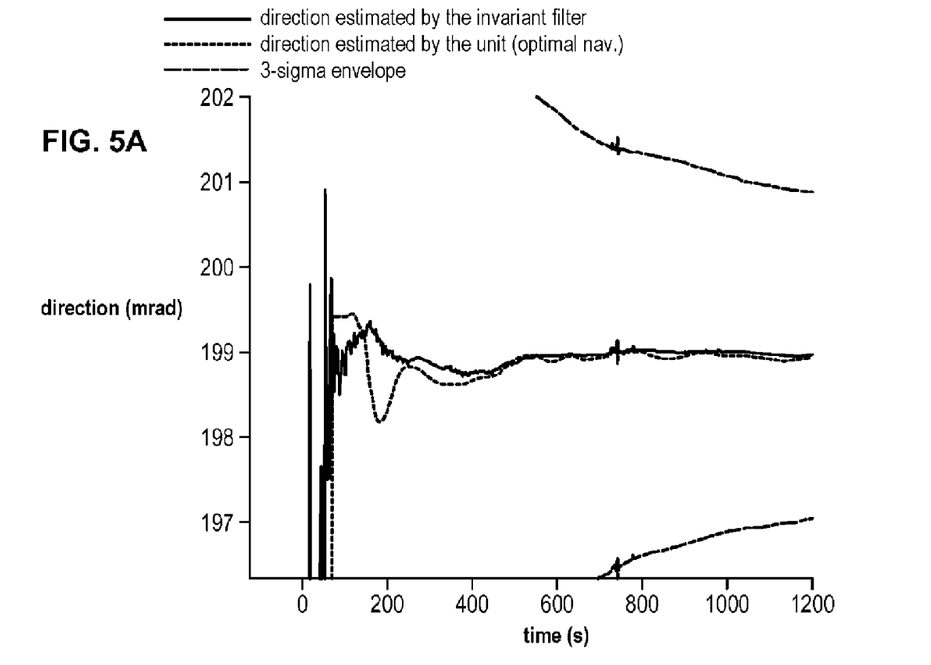
FIGS. 5A and 5B are direction alignment curves obtained by executing methods according to embodiments of the invention, and by executing a known method.
Figure 5B:
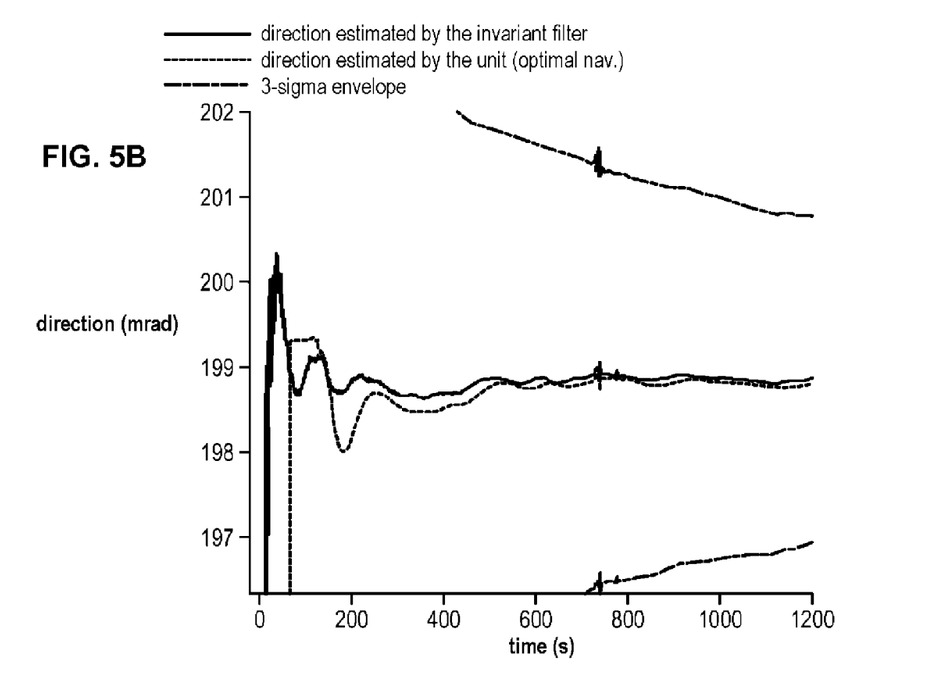

FIGS. 5A and 5B each compare the respective convergence speeds of the two alignment methods, and present direction estimations provided by the two methods.

In the example illustrated in FIG. 5A, integration of the zero speed information is done at low frequency. It is observed that after 200 seconds, the alignment method according to the invention (blue curve) provides direction estimation very close to its real value, while the estimation direction provided by the known process (green curve) continues to oscillate.

In the situation in question, the gains used in the updating step can be calculated in advance if the latitude is known. The filter takes very little calculation time and the zero speed information can be integrated at high frequency, as illustrated in FIG. 5B. The following figure presents the consequences of this choice in the same situation as earlier. The convergence here is much faster with the proposed method than with the method of the prior art.

Figure 6A:
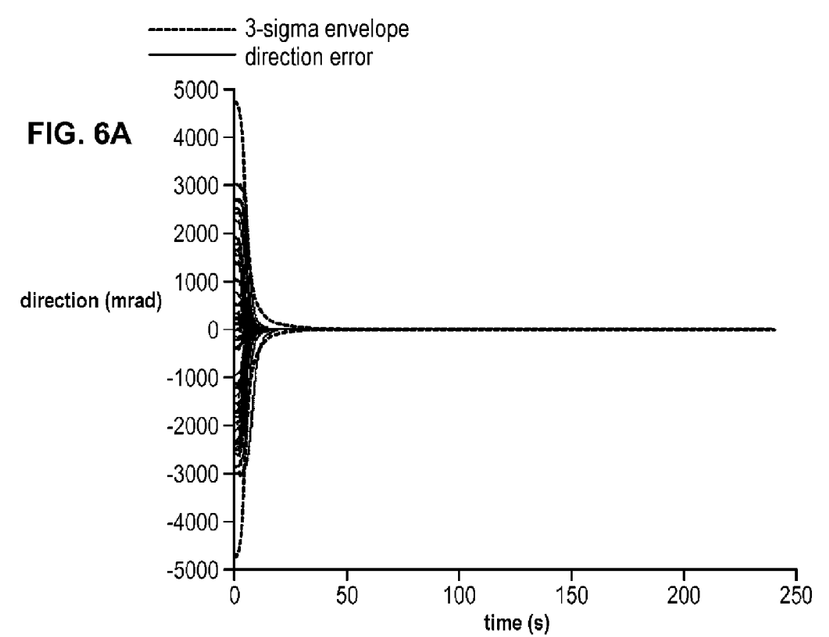
FIGS. 6A and 6B are comparative direction error curves obtained by carrying out the method of the invention, FIG. 6B being a closer view of 6A.
Figure 6B:
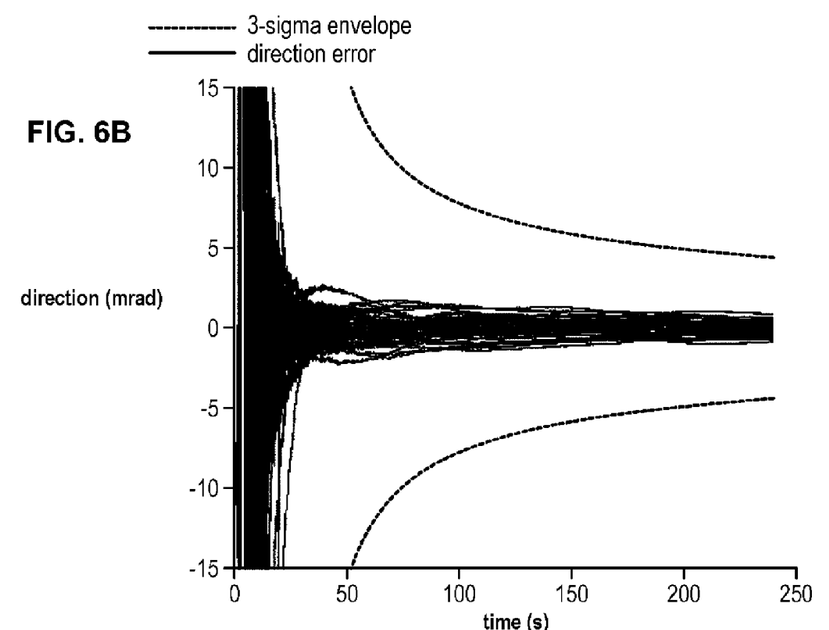

FIGS. 6A and 6B study the influence of estimation a priori of the direction on the results of the alignment method of the invention.

Direction estimations were randomly drawn according to a uniform law on $[0,2\pi]$ then the algorithm worked normally for 240 seconds.

FIG. 6A shows that the direction error very quickly becomes close to zero irrespective of the initialization during execution of the method according to the invention. FIG. 6B is a zoom of FIG. 6A.

Complete Mode Executed in Parallel with Simplified Mode

The simplified mode which has just been described is advantageously completed by a complete mode which is executed in parallel to the simplified mode.

Figure 7:
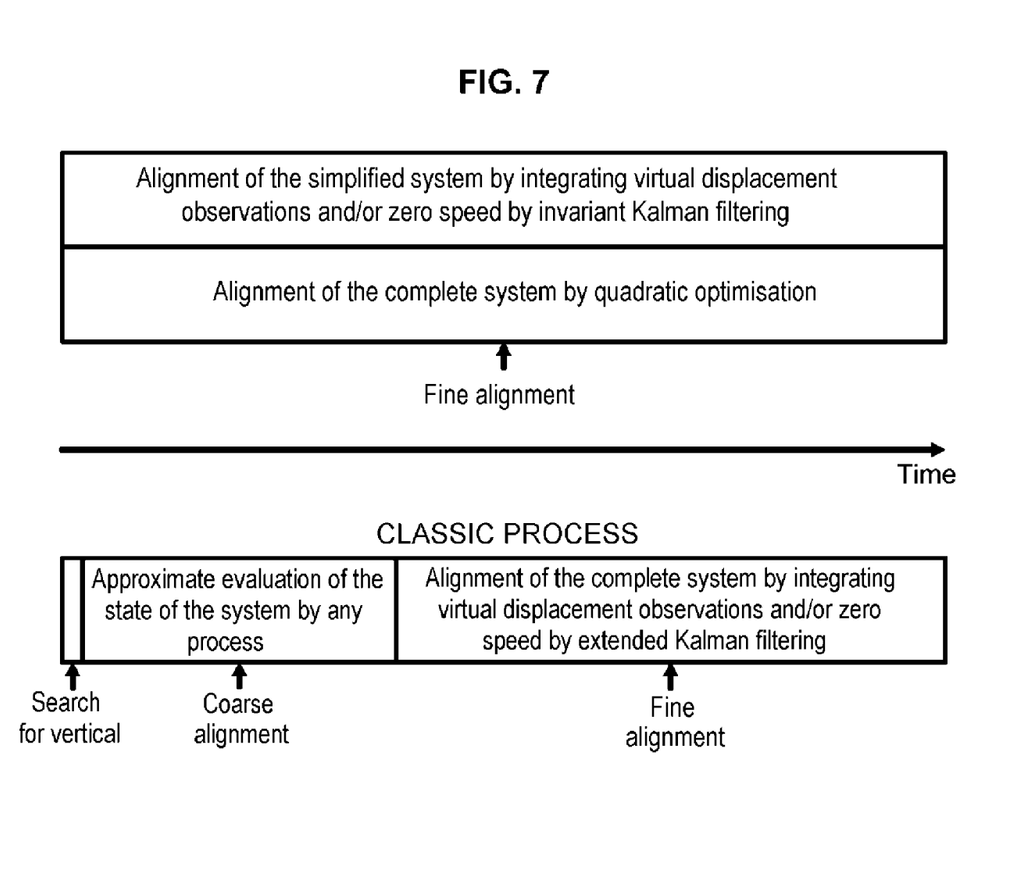
FIG. 7 illustrates, by way of comparison, the progress over time both of a process using a simplified alignment mode and a complete mode and also a process of conventional type.

This is illustrated by FIG. 7, which shows the progress over time both of a process carrying out a simplified alignment mode and a complete mode and also a process of known type.

This complete mode enables alignment by quadratic optimization.

It estimates additional quantities influencing the estimation in the following way:

at each instant, the differential relative to the additional quantities of the estimation provided by the simplified mode is calculated recursively.

the additional quantities are calculated by optimization of a quality criterion of the estimation.

The calculation of additional quantities by optimization of a quality criterion can be performed on completion of said alignment method. It can also be conducted ongoing or in a simplified way, at any instant of the alignment method.

The differential calculation used expresses the estimated state of the carrier device as a refined function of the additional quantities.

By comparison, the known process successively carries out:

processing of research into vertical;
approximate evaluation of the state of the system (coarse alignment);
alignment of the complete system by integrating virtual displacement observations and/or zero speed by extended Kalman filtering).

In the proposed case, an example of execution of a complete mode by quadratic optimization is the following:

If the measurements of the inertial sensors undergo determinist perturbation linked to additional quantities (bias, drift, scale factor errors, etc.), represented by a vector $\beta$, which must be evaluated during alignment, they are not integrated into the Kalman filter as in conventional processes. The following procedure is used:

For any given value of $\beta$ the inertial measurements can be corrected (subtract the bias drift given by beta, divided by the scale factor, etc.) then the simplified mode can be applied to the corrected measurements. The resulting estimation is a function $\hat{x}(\beta)$ of the additional quantities. This magnitude is not calculated as $\beta$ is unknown.

A reference value $\beta_0$ of the magnitude p is selected, and only the estimation $\hat{x}(\beta_0)$ will be really calculated.

Any initialization $\hat{x}_0$ of the quantities occurring in the simplified mode is selected.

A probability function applying to estimation of trajectory is selected: $f(\hat{x}_0(\beta), \hat{x}_1(\beta), \ldots, \hat{x}_t(\beta))$ The following steps are repeated over time:

Propagation step (PROP)

The inertial measurements are used to calculate the propagation step of $\hat{x}_t(\beta_0)$ by the simplified model, and the matrix $P_t$. The equation verified by $\hat{x}_t(\beta)$ is linearized around $\beta_0$ to recursively evolve the refined application $Ax_t$: $\beta \rightarrow \tilde{x}_t(\beta)$, which is the development to the first order of $\hat{x}_t(\beta)$ around $\beta_0$. $Ax_t$ is for example represented by a matrix.

Updating step (MAJ):

The information a priori on the trajectory is used to update $\hat{x}_t(\beta_0)$ by the process described in the simplified model. The updating equation of $\hat{x}_t(\beta)$ is the same as that of $\hat{x}_t(\beta_0)$ (it is specificity of the invariant Kalman filter), and it is used to update its development to the first order $Ax_t$.

Perturbation step (PERT):

This step can be applied a single time on completion of alignment, at different instants during alignment or at each step in time. An estimation $\hat{\beta}$ of $\beta$ is obtained by optimization: $\hat{\beta} = \arg\min_\beta f(\tilde{x}_0(\beta), \tilde{x}_1(\beta), \ldots, \tilde{x}_t(\beta))$. A refined estimation $\tilde{x}$ of the state x is given by $\tilde{x}_t = Ax_t(\hat{\beta})$ or another function of $\hat{\beta}$, equivalent to $Ax_t$ to the first order.

The function $f$ can be quadratic. It is not then necessary to store all the values of $\hat{x}_t(\beta_0)$ or $Ax_t$.

The function $f$ can involve additional quantities calculated recursively over time.

The function $f$ can for example be defined by:

$$f(\tilde{x}_0(\beta), \tilde{x}_1(\beta), \ldots, \tilde{x}_t(\beta)) = \sum_{i=0}^{t} [\tilde{x}_t(\beta)]^T \left(\frac{\partial h}{\partial \hat{x}_t(\beta_0)}\right)^T S_t^{-1} \frac{\partial h}{\partial \hat{x}_t(\beta_0)} [\tilde{x}_t(\beta)]$$

Where $S_t$ is given by the simplified mode and the symbol $^T$ designates the matrix transposition.

Another example of choice of function $f$, used hereinbelow, is:

$$f(\tilde{x}_0(\beta), \tilde{x}_1(\beta), \ldots, \tilde{x}_t(\beta)) = \sum_{i=0}^{t} \left\| \frac{\partial h}{\partial \hat{x}_t(\beta_0)} [\tilde{x}_t(\beta)] \right\|^2$$

The calculation of $\hat{\beta}$ can be performed a single time on completion of alignment, at different instants during alignment or permanently during alignment.

A recursive optimization process can be employed to calculate $\hat{\beta}$.

The estimation $\hat{\beta}$ can optionally be used as new reference value for the rest of the alignment by positing $\beta_0 = \hat{\beta}$.

The refined estimation $\tilde{x}_t(\hat{\beta})$ can optionally be used as final estimation in the simplified model for the rest of the alignment by positing $\hat{x}_t(\beta_0) = \tilde{x}_t(\hat{\beta})$.

An example of executing the method is described hereinbelow:

$$\beta = \begin{pmatrix} \beta_1 \\ \beta_2 \end{pmatrix}$$

is a vector of size 6×1 containing the drift of the three gyroscopes or gyrometers ($\beta_1$) and the bias of the three accelerometers ($\beta_2$).

The variables of the simplified mode are orientation and speed and can be written in a displacement matrix $$\chi_t = \begin{pmatrix} T_{\lceil \frac{c}{m} \rceil} & v_C \\ 0 & 1 \end{pmatrix}.$$

$\beta_0 = 0$ is selected as reference value of bias and drift. The measurements of the inertial sensors are therefore used without modification in the simplified mode.

If bias and drift noted by $\beta$ are considered, the estimation $$\hat{\chi}_t(\beta) = \begin{pmatrix} \hat{T}_{\lceil \frac{c}{m} \rceil}(\beta) & \hat{v}_C(\beta) \\ 0 & 1 \end{pmatrix},$$

whereof only an approximation to the first order around a reference value $\beta_0$ will be calculated, follows the following propagation equation:

$$\frac{d}{dt}\hat{\chi}_t(\beta) = \hat{\chi}_t(\beta) \cdot (i - \beta) + g \cdot \hat{\chi}_t(\beta)$$

And the following updating equation:

$$\hat{\chi}_t(\beta)^+ = \exp(-L_t \hat{v}_t(\beta))\hat{\chi}_t$$

where exp( ) is the exponential map arguing for a vector of size 6×1 and forming a displacement matrix. $\beta$ is the following elementary displacement matrix:

$$\beta = \begin{pmatrix} A(\beta_1) & \beta_2 \\ 0 & 1 \end{pmatrix}$$

The gain matrix $L_t$ is given by the simplified mode.

A simple way of writing the estimation to the first order of $\hat{\chi}_t(\beta)$ is:

$$\hat{\chi}_t(\beta) = \hat{\chi}_t(0) + \hat{\chi}_t(0)D(Z_t\beta)$$

where D( ) is the linear application arguing for a vector $$x = \begin{pmatrix} x_1 \\ x_2 \end{pmatrix}$$

of size 6×1 and forming the elementary displacement matrix $$\begin{pmatrix} A(x_1) & x_2 \\ 0 & 1 \end{pmatrix}$$

of size 4×4. The matrix $Z_t$ is of size 6×6 and verifies the following propagation equation:

$$\frac{d}{dt}Z_t = ad_i Z_t - I_6$$

And the following updating equation:

$$Z_t^+ = I_6 - Ad_{\hat{\chi}_t^{+-1}}D\exp(-L_t \mathcal{V}(\hat{\chi}_t))L_t \begin{pmatrix} 0 & \hat{T}_{\lceil \frac{c}{m} \rceil} \end{pmatrix} Z_t$$

Where the matrix $L_t$ is given by the simplified mode, the displacement matrices $\hat{\chi}_t$ and $\hat{\chi}_t^+$ given by the simplified mode, the rotation matrix $$\hat{T}\begin{bmatrix}C\\m\end{bmatrix}$$

is given by the simplified mode, the matrix $ad_i$ is defined by $$ad_i = \begin{pmatrix} A(\omega_t) & 0 \\ A(f_t) & A(\omega_t) \end{pmatrix}$$

($\Omega_t$ and $f_t$ are the measurements of the inertial sensors), the matrix $$Ad_{\hat{\chi}_t^{+-1}}$$

is defined by $$\hat{\chi}_t = \begin{pmatrix} \hat{T}\begin{bmatrix}C\\m\end{bmatrix} & \hat{v}_t \\ 0 & 1 \end{pmatrix}$$

the function $v$ argues for a displacement matrix of size 4×4 (here the matrix $$Ad_{\hat{\chi}_t^{+-1}} = \begin{pmatrix} (\hat{T}^+\begin{bmatrix}C\\m\end{bmatrix})^T & 0 \\ A\left(-(\hat{T}^+\begin{bmatrix}C\\m\end{bmatrix})^T \hat{v}_t^+\right)(\hat{T}^+\begin{bmatrix}C\\m\end{bmatrix})^T & (\hat{T}^+\begin{bmatrix}C\\m\end{bmatrix})^T \end{pmatrix},$$

and forms the vector of size 3×1 located at top right (here $\hat{v}_t$). The function Dexp is the derivative of the exponential map in the following sense:

$$\exp(\xi+u) = [I_4 + D(D \exp(\xi)u] \exp(\xi)$$

where $\xi$ and $u$ are vectors of size 3, $u$ is of a standard much less than 1, $I_4$ is the identity matrix of size 4 and Dexp($\xi$) is a matrix of size 6×6.
The selected probability function is defined by the following formula:

$$f(\tilde{x}_0(\beta), \tilde{x}_1(\beta), \ldots, \tilde{x}_t(\beta)) = \sum_{i=0}^{t} \left\| \frac{\partial h}{\partial \hat{x}_t(\beta_0)} [\tilde{x}_t(\beta)] \right\|^2$$

It is rewritten as:

$$f(\tilde{x}_0(\beta), \tilde{x}_1(\beta), \ldots, \tilde{x}_t(\beta)) = \sum_{i=0}^{t} \left\| -\hat{T}^T\begin{bmatrix}C\\m\end{bmatrix}\hat{v}_c - \left[A(\hat{T}^T\begin{bmatrix}C\\m\end{bmatrix}\hat{v}_c), I_3\right]Z_t\beta \right\|^2$$

It is therefore not necessary to store information on the whole trajectory, but to write $f(\beta) = \beta^T S_1 \beta + S_2^T \beta + \text{constant}$ and support the matrices $S_1$ and $S_2$ by developing the expression of $f$.
The complete algorithm (simplified mode and complete mode) is therefore the following:
The reference value of bias and drift is $\beta_0 = 0$. The initial estimation $\hat{\chi}_0(0)$ and the covariance matrix $\hat{P}$ (representing uncertainty) are initialized in any way which can depend on the situation. The matrix $Z_t$ representing the development to the first order of $\hat{\chi}_t(\beta)$ is initialized at $Z_0 = 0_{6\times6}$. The matrices $S_1$ and $S_2$ are initialized at $S_1 = 0_{6\times6}$ and $S_2 = 0_{6\times1}$.
Then the following steps are repeated throughout alignment:
Propagation step (PROP):
Propagation of the uncertainty:

$$\dot{P}_t = ad_{g_t} P_t + P_t ad_{g_t}^T + Q$$

Propagation of the estimation:

$$\frac{d}{dt}\hat{\chi}_t(0) = \hat{\chi}_t(0) \cdot i + g_t \cdot \hat{\chi}_t(\beta_0)$$

Propagation of the development to the first order:

$$\frac{d}{dt}Z_t = ad_i Z_t - I_6$$

Updating step (MAJ) to times $t_r$:
Update of the uncertainty:

$$S_t = HP_{t_r}H^T + R$$

$$L_t = P_{t_r}H^T S_t^{-1}$$

$$P_{t_r}^+ = (I_6 - k_t H)P_{t_r}$$

Update of the estimation:

$$\hat{\chi}_t^+(0) = \exp(L_t \hat{v}_t^+(0))\hat{\chi}(0)$$

Update of the development to the first order:

$$Z_t^+ = I_6 - Ad_{\hat{\chi}_t^{+-1}} Dexp(-L_t V(\hat{\chi}_t))L_t \begin{pmatrix} 0 & \hat{T}^T\begin{bmatrix}C\\m\end{bmatrix} \end{pmatrix} Z_t$$

$$S_1 = S_1 + \left(\left[A(\hat{T}^T\begin{bmatrix}C\\m\end{bmatrix}(0)^T \hat{v}_C(0)), I_3\right]Z_t\right)^T \left(\left[A(\hat{T}^T\begin{bmatrix}C\\m\end{bmatrix}^T \hat{v}_C(0)), I_3\right]Z_t\right)$$

$$S_2 = S_2 + \left(\left[A(\hat{T}^T\begin{bmatrix}C\\m\end{bmatrix}(0)^T \hat{v}_C(0)), I_3\right]Z_t\right)^T \hat{T}^T\begin{bmatrix}C\\m\end{bmatrix}\hat{v}_C(0)$$

Perturbation step (PERT):
Estimation of bias and drift:
$\hat{\beta}$ is the solution of the linear unit $S_1\hat{\beta} = -½S_2$.
Refined estimation of the quantities of the simplified mode:

$$\tilde{\chi}_t(\hat{\beta}) = \hat{\chi}_t \exp(Z_t\hat{\beta})$$

The function exp can be replaced by another function equivalent to the first order.

Other Embodiments

To improve the robustness and performance of the process, the method described can be used several times in parallel, initialized on different orientations then one or more of the resulting estimations can be selected. Different selection criteria are possible.
So as not to increase the calculation load linked to the propagation step, the equations verified by $\hat{\chi}_t$ and $Z_t$ can be expressed in a generic form of the type:

$$G_{t \to t} = I_4, \quad \frac{d}{dT}G_{t \to T} = g_t \cdot G_{t \to T} \quad (1)$$

-continued $$J_{t \to t} = I_4, \frac{d}{dT} J_{t \to T} = J_{t \to T} \cdot i \qquad (2)$$

$$A_{t \to t} = I_4, \frac{d}{dT} A_{t \to T} = -A_{t \to T} a d_i \qquad (3)$$

$$B_{t \to t} = 0, \frac{d}{dT} B_{t \to T} = -A_{t \to T} \qquad (4)$$

$$\hat{\chi}_T = G_{t \to T} \hat{\chi}_t J_{t \to T} \qquad (5)$$

$$Z_T = A_{t \to T}^{-1}(Z_t + B_{t \to T}) \qquad (6)$$

The equations (1), (2), (3) and (4) are calculated a single time during the propagation step, the equations (5) and (6) applied to the quantities $\hat{\chi}$ and Z associated with each of the filters operating in parallel, at the start of the updating step. The same gains can also be used for all the filters.

Selection of the estimation is done by calculating a probability criterion for each of the filters then selecting the best result. This criterion can be for example a quadratic function of the estimations of speed over time. Likewise, several estimations can be used on a coherence criterion, for example both (or more) giving the closest results. One of them or any function of these estimations, for example an average, is then selected as final estimation.

Also, all the processes described can be carried out by replacing the virtual speed observation by a virtual position observation. The simplified state also contains the position and is placed in a matrix of the form:

$$\chi = \begin{pmatrix} T_{[C/m]} & v_C & x_C \\ 0_{1 \times 3} & 1 & 0 \\ 0_{1 \times 3} & 0 & 1 \end{pmatrix}$$

The observation function becomes:

$$h(\chi) = \chi^{-1} \begin{pmatrix} w_h \\ 0 \\ 1 \end{pmatrix}$$

The rest of the calculations are done in the same way as for a zero speed observation.

By way of yet another variant, all the processes described can be performed by representing the data in any other way. The orientations could for example be parameterized by quaternions or Euler angles and all calculations transposed.

Likewise, the gain functions $K_n(.)$ can be selected by any process other than that proposed. A procedure of Unscented Kalman Filter type can for example be applied to the non-linear error equation, constant gains optimized on simulations can be utilized, etc.

Also, any initialization process can be added to the start of the alignment procedure. The accelerometers can be used for example to search for the vertical.

The processes described can be integrated into a wider architecture, for example combined extended Kalman filters, a bank of Kalman filters, etc.

Also, if the inertial measurement unit is not placed at the same place as the point to which the position information refers but this point is fixed and known in the reference frame of the unit (for example if the GPS receiver is remote from the unit), the same procedure as for alignment can be applied by virtual observation of zero displacement, by replacing zero by the known position (the lever arm separating the two receivers in the case of GPS and a unit).

The invention claimed is:

1. A method for aligning a mobile carrier device (P) with respect to an inertial reference frame (Ri), wherein the carrier device comprises an inertial measurement unit (IN), the inertial measurement unit comprising a plurality of inertial sensors and at least one invariant Kalman filter, the method comprising the following steps for estimating a state of the carrier device (P) representative of its speed and its orientation:
   in a propagation step (PROP), determining an estimated current state from a preceding estimated state and measurements of the inertial sensors,
   in an update step of the at least one invariant Kalman filter, updating the estimated current state from the information a priori on a trajectory of the carrier device (P) using updating equations used in the update step wherein at least one speed occurs,
wherein the method comprises a simplified mode to allow processing by the at least one invariant Kalman filter, in which bias of the sensors are not estimated during the propagation step and the update step, each said at least one speed occurring in the updating equations being expressed in a work reference frame (Rt) translated relative to the inertial reference frame (Ri), wherein the work reference frame has an origin moving along an inertial reference trajectory.

2. The method according to claim 1, wherein the propagation step uses propagation equations which produce a gravity variable which depends only on time.

3. The method according to claim 1, wherein the inertial reference trajectory is constructed from information a priori which is not measured by the inertial sensors.

4. The method according to claim 1, wherein in the simplified mode, each position occurring in the updating equations is expressed in a work reference frame (Rt) translated relative to the inertial reference frame (Ri).

5. The method according to claim 1, wherein processing is also carried out in parallel in which additional quantities influencing the estimation are estimated in the following way:
   at each instant, the differential relative to the additional quantities of the estimation provided by the simplified mode is calculated recursively,
   the additional quantities are calculated by optimization of a quality criterion of the estimation.

6. The method according to claim 5, wherein calculation of the additional quantities by optimization of a quality criterion is performed on completion of said alignment method.

7. The method according to claim 5, wherein calculation of the additional quantities by optimization of a quality criterion is conducted permanently or at one or more instants of the alignment method.

8. The method according to claim 1, wherein a series of gains is calculated prior to execution of the propagation step and the update step in simplified mode, each gain occurring in an iteration of the updating step.

9. The method according to claim 1, wherein the work reference frame (Rt) has an origin corresponding to a point of the inertial measurement unit.

10. The method according to one of claims 1 to 8, wherein the origin of the work reference frame follows a GPS trajectory.

11. An inertial measurement unit (IN) movable in an inertial reference frame (Ri) and comprising:

a plurality of inertial sensors (CV, CO),
at least one invariant Kalman filter,
an embedded computer of said unit performing the following steps for estimating a state of the carrier device (P) representative of its speed and its orientation:
- a propagation step (PROP) determining an estimated current state from a preceding estimated state and measurements of the inertial sensors,
- an update step updating the estimated state by means of the information a priori on the trajectory of the carrier device (P), wherein, to allow processing by the invariant Kalman filter, the computer is configured to execute an alignment method according to claim 1.

12. A non-transitory computer readable medium encoded with a computer program product for program code instructions for execution of the steps of the method according to claim 1, when this program executed by a computer embedded in an inertial measurement unit.

* * * * *